(12) United States Patent
Marchesseault

(10) Patent No.: US 6,343,308 B1
(45) Date of Patent: Jan. 29, 2002

(54) SYSTEMS, METHODS AND COMPUTER PROGRAMS FOR MIXING DIFFERENT VERSIONS OF JAVA CLASSES

(75) Inventor: Bradley T. Marchesseault, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/911,153

(22) Filed: Aug. 14, 1997

(51) Int. Cl.[7] ............................. G06F 17/00; G06F 9/00
(52) U.S. Cl. ............................................. 709/1; 717/11
(58) Field of Search ................................. 709/300, 303, 709/1, 310–400, 222; 395/705; 345/709, 733; 707/10, 1; 712/226; 717/11; 710/200

(56) References Cited

U.S. PATENT DOCUMENTS

| | | | |
|---|---|---|---|
| 5,805,829 A | * | 9/1998 | Cohen et al. ............... 709/200 |
| 5,815,661 A | * | 9/1998 | Gosling ..................... 709/200 |
| 5,878,432 A | * | 3/1999 | Misheki et al. ............ 707/103 |
| 5,884,078 A | * | 3/1999 | Faustini ..................... 395/701 |
| 5,999,988 A | * | 12/1999 | Pelegri-Llopart et al. ... 709/304 |
| 6,020,886 A | * | 2/2000 | Jacober et al. .............. 345/709 |
| 6,115,550 A | * | 9/2000 | Hunter et al. ................. 717/11 |

* cited by examiner

Primary Examiner—Alvin Oberley
Assistant Examiner—Van H. Nguyen
(74) Attorney, Agent, or Firm—Myers Bigel Sibley & Sajovec; Jeanine S. Ray-Yarletts

(57) ABSTRACT

Methods, systems and computer program products execute an application within a first version of a runtime system, wherein the application includes at least one call to an object class of a second version of the runtime system. An application, including object classes called by the application, is loaded into a first version of the runtime system. A class interface having at least one identifier for at least one respective object class of a second runtime system version called by the application is loaded into the first version of the runtime system. The application is then executed within the first version of the runtime system without causing an error condition by any of the calls to the second runtime system version object classes named in the class interface. Calls to object classes of the second runtime system version not identified within the downloaded class interface are not allowed.

29 Claims, 3 Drawing Sheets

SYSTEMS, METHODS AND COMPUTER PROGRAMS FOR MIXING DIFFERENT VERSIONS OF JAVA CLASSES

FIELD OF THE INVENTION

The present invention relates generally to object oriented computer programming and more particularly to object oriented computer programming implemented in the Java programming language.

BACKGROUND OF THE INVENTION

Java is an object-oriented programming language developed by Sun Microsystems, Mountain View, Calif. Java is a portable and architecturally neutral language. Java source code is compiled into a machine-independent format that can be run on any machine with a Java runtime system known as the Java Virtual Machine (JVM). The JVM is defined as an imaginary machine that is implemented by emulating a processor through the use of software on a real machine. Accordingly machines running under diverse operating systems, including UNIX, Windows NT, and MacIntosh having a JVM can execute the same Java program.

Web browsers including Netscape Navigator® and Microsoft Internet Explorer® are referred to as Java-enabled browsers because they include a version of the JVM. Java applets are programs written in Java and configured to run within Java-enabled browsers. Handled in a manner similar to the way images are handled, Java applets are displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

Java source code is compiled into bytecode using a Java compiler referred to as a Javac. Compiled Java programs are saved in files with the extension "class". When a Java-enabled web browser recognizes that an applet has been requested, a Java interpreter program runs the applet bytecode on the JVM.

Up until fairly recently, Java version 1.0 was the only version available. Java version 1.1 is now available and programs are being written utilizing various classes that are unique to version 1.1. JVMs enabled for Java version 1.0 cannot run classes written in Java version 1.1. As a result, when Java applets are encountered that contain method calls to version 1.1 classes, the applet crashes. Heretofore, the only available remedy for this problem has been to produce separate 1.0 and 1.1 versions of each Java applet. Unfortunately, the code maintenance that would be required for multiple versions of the same program renders this a rather impractical solution. Compounding the problem is that newer versions of Java are presently being developed. Unless users update their browsers to versions capable of running the latter versions of Java, the ability to run Java applets written in these newer versions will be thwarted.

SUMMARY OF THE INVENTION

In view of the above discussion, it is an object of the present invention to run Java applets containing features not supported by the JVM on which the applet has been called to run.

It is another object of the present invention to run Java applets written in any version of Java within any JVM without requiring separate Java versions of the applet.

These and other objects of the present invention are provided by methods, systems and computer program products for executing an application within a first version of a runtime system, wherein the application includes at least one call to an object class of a second version of the runtime system. According to one aspect of the present invention, an application, including each object class called by the application, is loaded into a first version of the runtime system. A class interface having at least one identifier for at least one respective object class of a second runtime system version called by the application is loaded into the first version of the runtime system. The application is then executed within the first version of the runtime system without causing an error condition by any of the calls to the second runtime system version object classes named in the class interface. Calls to object classes of the second runtime system version not identified within the downloaded class interface are not allowed. Operations may also include identifying each loaded second runtime system version object class and verifying that each identified second runtime system version object class has a respective identifier in the class interface.

According to a further aspect of the present invention, methods, systems and computer program products for executing an applet within a first Java version of a JVM running on a client, wherein the applet includes at least one call to a second Java version object class, are provided. A request to activate an applet is made to a server hosting the applet from a client. The Java applet, containing calls to various object classes, is then downloaded to the client. A class interface having a respective identifier for each respective second Java version object class called by the applet is also downloaded to the client. The downloaded applet is then executed within the JVM without causing an error condition by calls to a second Java version object class.

Each downloaded second Java version object class is identified by the loader within the JVM. The existence in the class interface of a respective identifier for each downloaded second Java version object class is verified. The downloaded applet is then executed within the JVM without causing error conditions by any calls to second Java version object classes having a respective identifier in the class interface. Calls to second Java version object classes not identified within the downloaded class interface are not allowed.

The present invention is advantageous because separate versions of a Java applet do not have to be written for each Java version of a JVM. When an applet is written in Java version 1.1, it may call methods that utilize classes available only to Java version 1.1. The class interface of the present invention contains a list of these Java version 1.1 classes. Both classes must be compiled with the interface, but only the version 1.1 class needs to implement the class interface. This allows the 1.0 compiler to compile the 1.0 class without needing to know the internals of the version 1.1 class, only the methods the 1.1 class implements as defined in the interface.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
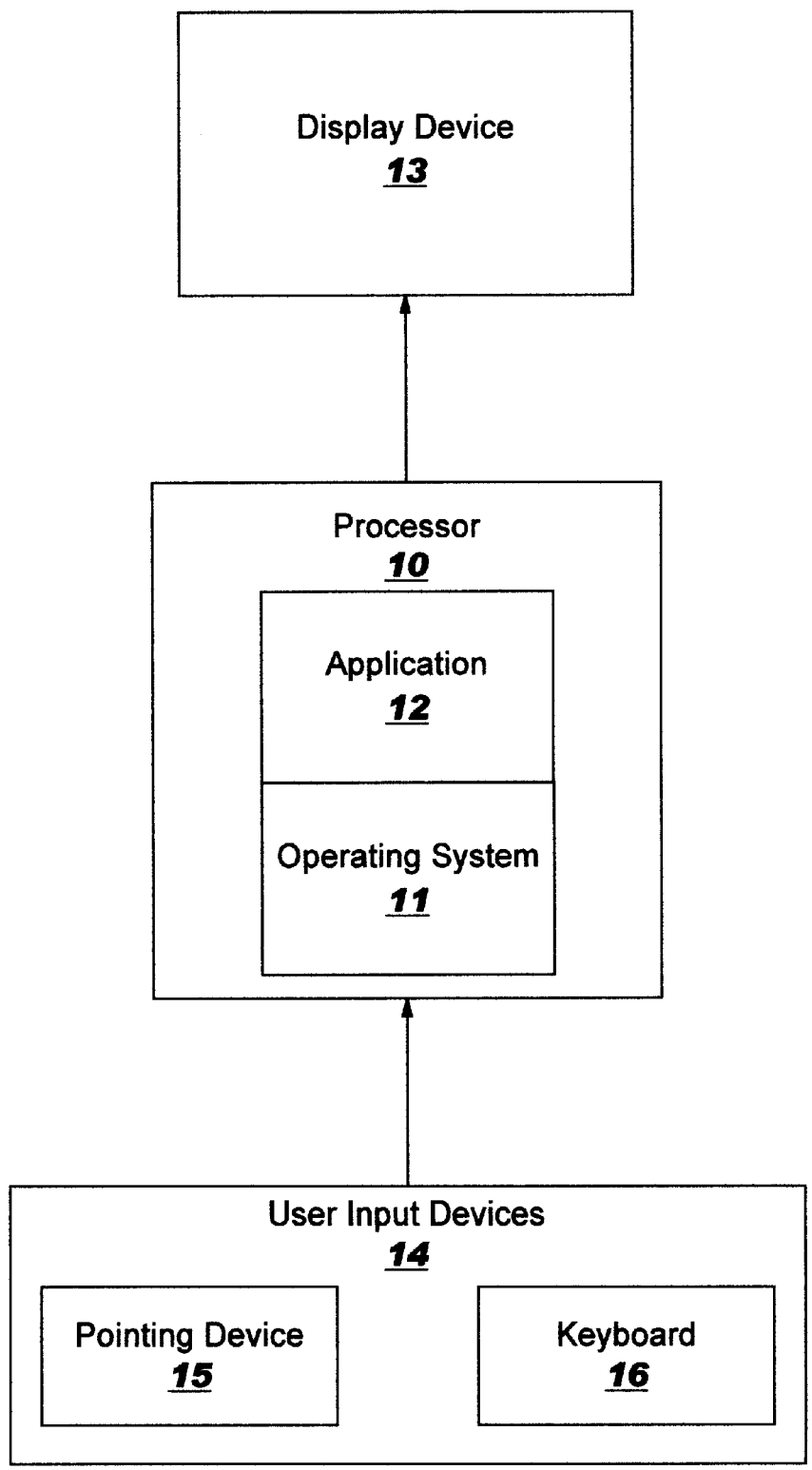
FIG. 1 illustrates an exemplary data processing system in which the present invention may be implemented.

Referring now to FIG. 1, an exemplary data processing system in which the present invention may be implemented is illustrated. As seen in FIG. 1, a data processor 10 may have an operating system 11 resident therein. An application program 12 typically executes via the operating system 11. The processor 10 displays information on a display device 13 which has a plurality of picture elements (collectively referred to as a screen). Typically, the information is displayed on the display device 13 within a user interface environment. The contents of the screen of the display device 13 and, therefore, the appearance of the user interface environment, may be controlled or altered by the application program 12 or the operating system 11 either individually or in combination. For obtaining input from a user, the operating system 11, the application program 12, or both, may utilize user input devices 14. User input devices 14 may include a pointing device 15, such as a mouse, and a keyboard 16 or other input devices known to those of skill in the art. User input devices 14 may be used to designate areas of the screen or locations on the screen such as the border of a workspace or the corner of the borders of the workspace.

Figure 2:
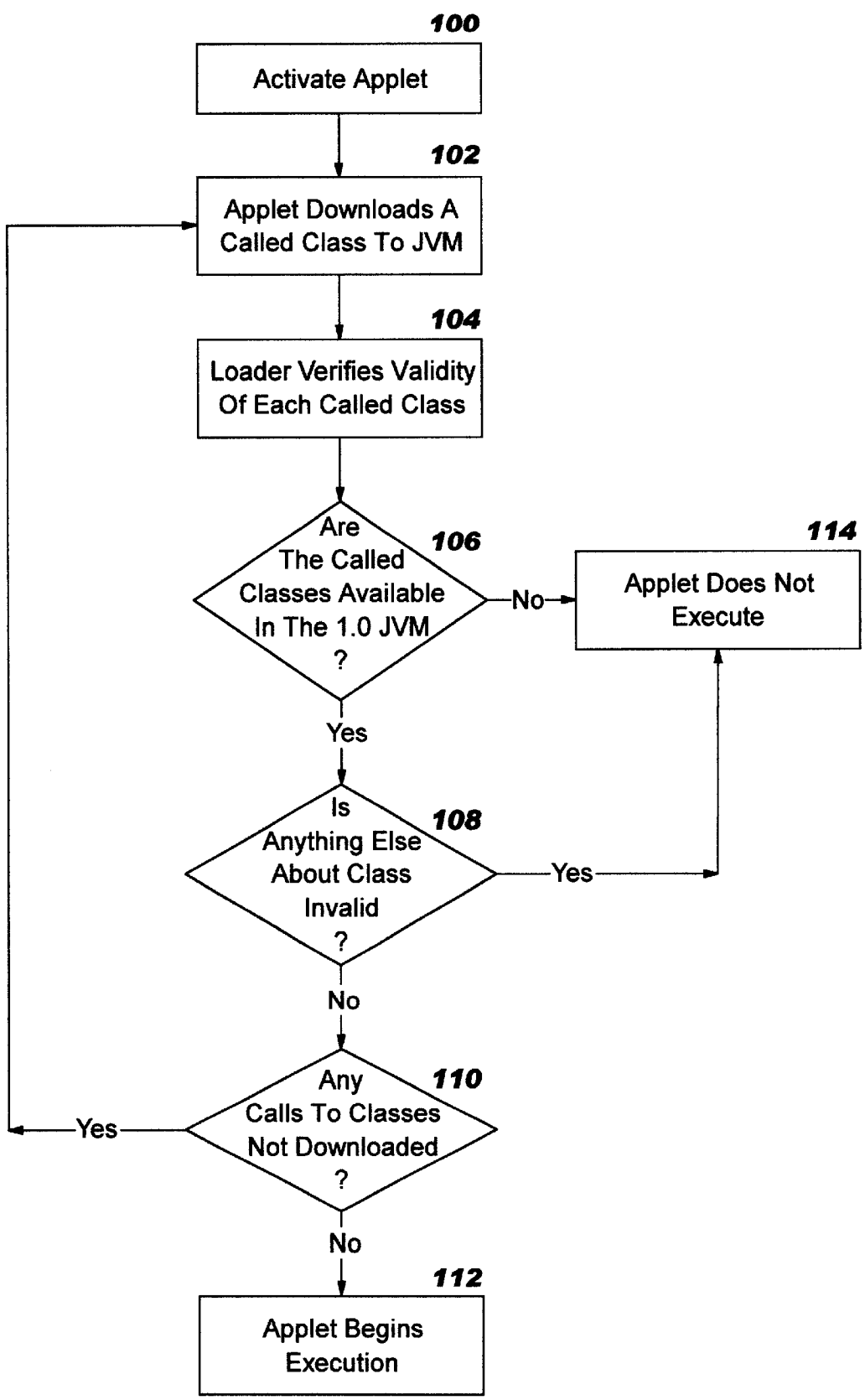
FIGS. 2–3 are flowcharts schematically illustrating operations for various aspects of the present invention.
Figure 3:
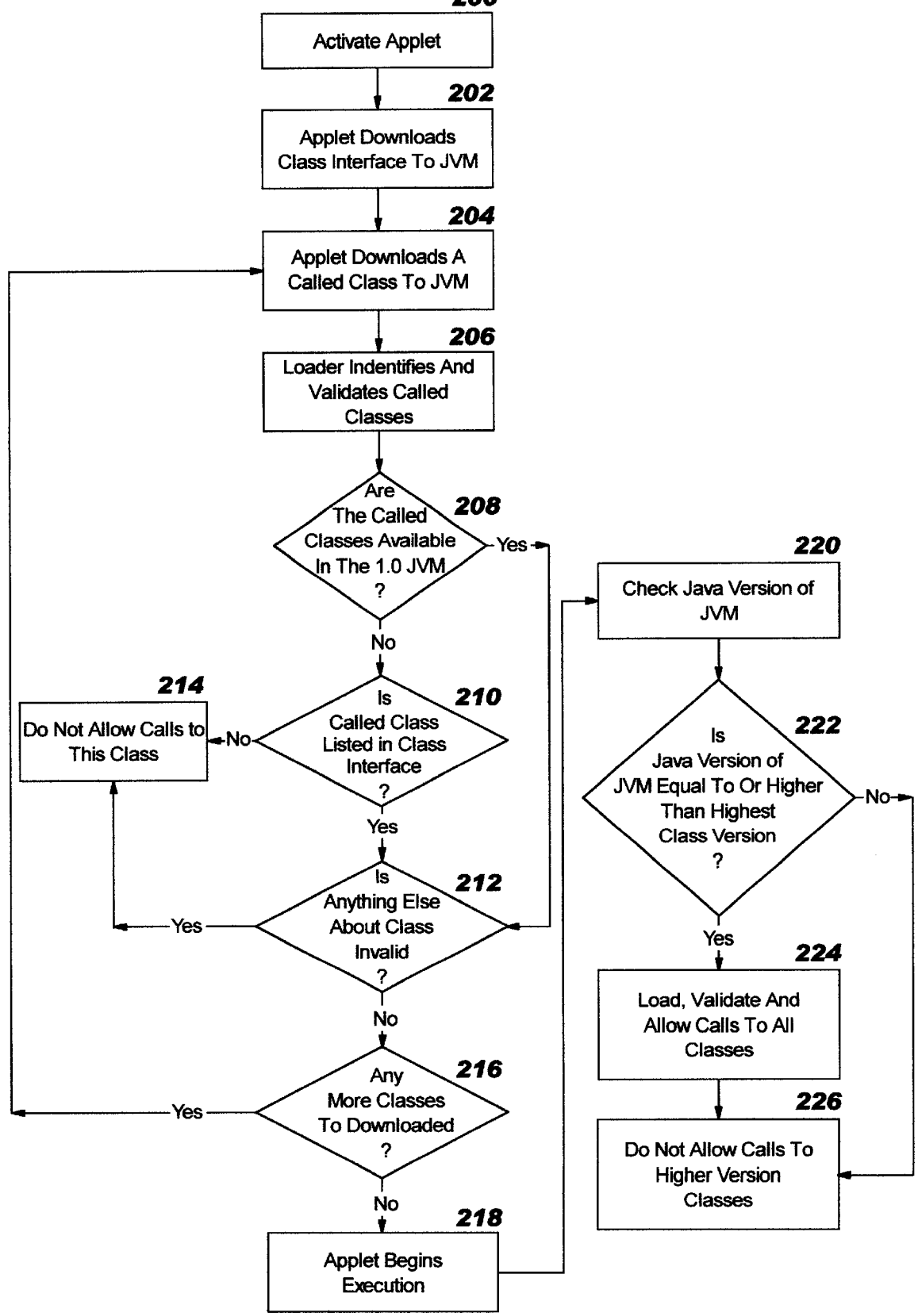

Operations for various aspects of the present invention are schematically illustrated in FIGS. 2 and 3. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring now to FIG. 2, operations for executing a Java applet from a Java 1.0-enabled browser on a client machine are schematically illustrated. The web browser activates a Java applet located on a server (Block 100). As known to those skilled in the art, Java applets are embedded within an HTML document via an applet tag (<applet>). This tag is used to describe the applet, its parameters, and its dimensions. When an applet tag is read by the browser and activated, the browser downloads the code for the applet from the specified locations and then executes the applet on the client.

As is known to those skilled in the art, applet activation may occur automatically upon the loading of an HTML page by the web browser, by activating a link, or by other user actions. Once activated, the applet begins to automatically download each class called within the applet, regardless of the Java version of the class (Block 102). A called class may be downloaded from the server or from the local machine.

For each downloaded class, a loader verifies the validity of the class (Block 104). As is known to those skilled in the art, the loader is resident within the JVM of a Java-compliant browser. The loader performs validity verification by parsing through the code of each downloaded class and verifying that methods called therewithin are available. As one of its tasks, the loader determines whether all called classes are available prior to applet execution (Block 106). If the version of any called class within the applet is higher than version 1.0 and therefore not available in the 1.0 JVM, the applet will not execute (Block 114). Even if the called class does not serve an essential function within the applet, the applet will not execute. Typically various error messages are also returned to the user when an applet fails to execute.

If the determination is made that all called classes are available in the 1.0 JVM, the loader determines whether anything else about the downloaded class is invalid. This may include verifying that the downloaded code has not been tampered with. Also, as the loader loads each class, it validates all method calls within the class. If any calls are to external methods in other classes, those external methods are loaded and verified as well. If anything about the downloaded class is invalid, the applet does not execute (Block 114).

If a downloaded class does not have a Java version higher than 1.0 and nothing else about the downloaded class is invalid, a determination is made whether there is a call to download another class (Block 110). If the answer is yes, the steps in Block 102 to Block 108 are repeated for any additional classes downloaded. If the answer is no, the applet begins execution (Block 112).

As illustrated in FIG. 2, if a Java class called by an applet has a Java version higher than Java version 1.0, the JVM will not be able to execute the applet. Typically various error messages are presented to the user when this happens. It is often undesirable for an applet not to execute even if some classes cannot be called.

For example, the Java class java.awt.PrintJob is only available in JVM versions 1.1 and higher. If a program makes a call to this class, but runs on a JVM lower than version 1.1, the program may not load and therefore not execute. Some JVM version 1.0 loaders will not load the applet because it contains a call to a class that does not exist in version 1.0, even if the applet never explicitly call the PrintJob method. The errors that are issued are different depending on the JVM on which the applet is loaded.

Referring now to FIG. 3, operations for running Java applets according to aspects of the present invention are schematically illustrated. The present invention allows an applet to execute even though some of the Java classes called therefrom have a higher Java version than the Java version of the JVM. A web browser activates a Java applet located on a server (Block 200). As described above, activation may occur automatically upon the loading of an HTML page by the web browser, by activating a link, or by other user actions.

For Java applets written in Java versions higher than 1.0, a class interface associated with the activated applet is downloaded to the client browser (Block 202). The class interface is a special Java class that contains no executable code. Only the names of methods calling Java classes for versions higher than 1.0 are provided within the class interface. As described above, the activated applet automatically downloads each class called within the applet, regardless of the Java version of the class (Block 204).

For each downloaded class, the JVM loader verifies the Java version of the called class (Block 206). A determination is made whether the called class is available in the 1.0 JVM (Block 208). If the answer is no, a determination is then made whether the called class is listed in the downloaded class interface (Block 210). The present invention allows no direct calls to be made to a version 1.1 (or higher) class method. Instead, any call to a version 1.1 (or higher) class method is made to a method within the class interface. Since there are no direct calls to a version 1.1 class method, the loader will not interrogate the version 1.1 class even though it is downloaded. The loader will interrogate the version 1.0 classes and all methods called by the 1.0 classes, which include calls to methods in the class interface. The loader will load the version 1.0 class and the class interface, and the applet will continue executing.

The class interface preferably contains only method names that exist in version 1.1 or higher Java classes. However, the loader does not treat them as direct calls to the version 1.1 or higher Java classes. The class interface prevents a JVM version 1.0 loader from interrogating a version 1.1 or higher Java class as the classes are loaded. If a JVM version 1.0 loader were to try to load a Java version 1.1 or higher class, applet execution would fail as described above with respect to FIG. 2.

If the called class is not listed in the downloaded class interface, the JVM is prevented from making calls to this class (Block 214). If the called class is listed in the class interface, or if the Java version of the called class is not higher than Java version 1.0 (Block 208), a determination is made whether there is anything else about the called class that is invalid (Block 212). A determination is then made whether there are any more classes to download (Block 216). The steps represented by Blocks 204 through 212 are then repeated for any additional classes downloaded.

If there are no more classes to download, the applet begins execution (Block 218). The Java version of the JVM is then checked (Block 220). A determination is then made whether the Java version of the JVM is equal to or higher than the highest version of a downloaded class (Block 222). If the answer is no, the applet is prevented from calling classes with higher versions than the JVM (Block 226). This is referred to as defensive code which allows the applet to execute without crashing. If the answer is yes, the applet is allowed to call all classes (Block 224).

The Java version 1.1 or higher classes are not loaded and verified when the version 1.0 classes and class interfaces are loaded. Once the Java version 1.0 classes and class interfaces are loaded, the applet executes and determines whether or not to load the version 1.1 classes. If the applet determines that it is running within a version 1.1 JVM, it will load and validate the Java version 1.1 classes (Block 224).

Prior to the present invention, downloaded Java classes having versions higher than the version of a JVM on the local machine, or calling a method having a version higher than the version of the JVM on the local machine, would be declared invalid and the applet would fail. The present invention may be utilized whenever a JVM version precedes the Java version of a downloaded class. The present invention may be utilized with any versions of Java and are not limited to versions 1.0 and 1.1. For example, the present invention would be utilized with a Java version 1.1 JVM and Java version 2.0 classes.

EXAMPLE

The following is provided as an exemplary is embodiment of the present invention. When an applet is activated by a client browser, the applet code begins the download process to the client browser of various classes utilized by the applet. The following version 1.0 and 1.1 classes may be called by an applet:

---

Java Version 1.0 Class

```
/***************************************************************/
/*    Coexistance test for 1.0 and 1.1 classes                 */
/***************************************************************/
import java.awt.*;
import java.util.*;
import java.applet.*;
import java.lang.*;
import COM.ibm.eNetwork.HOD.common.JavaVersion;
/***************************************************************/
/*    CLASS Coexist                                            */
/***************************************************************/
public class Coexist extends Applet {
       String    LocaleName         =   new String(""),
                 LocalID            =   new String(""),
                 LocaleCountryName  =   new String(""),
                 output             =   new String("");
/***************************************************************/
```

-continued

```
    public void init( )
    {
        //LocaleAbstract Locale= null;
        LocaleInterface locale= null;
        resize(600, 400)
        addNotify( );
        if (JavaVersion.isVersion110( )) {
            //MyLocals test = new MyLocals( );
            //test.sayHello( );
            try {
                Class classObject = Class.forName("MyLocale");
                //locale = (LocaleAbstract) classObject.newInstance( );
                locale = (LocaleInterface) classObject.newInstance( );
                locale.fakeConstructor(this);
            }
            catch (ClassNotFoundException e) {
                System.out.println("Class not found");
            }
            catch (InstantiationException e) {
                System.out.println("Instantiation Exception");
            }
            catch (IllegalAccessException e) {
                System.out.println("Illegal Access Exception");
            }
            locale.sayHello("PARM");
            LocaleName        =    "LocaleName = "+locale.getLocaleName( );
            LocaleID          =    "LocaleID = "+locale.getLocaleID( );
            LocaleCountryName =    "LocaleCountryName =
"+locale.getLocaleCountryName( );
        }
        else {
            LocaleName        =    "This version is less than 1.1.0 and";
            LocaleID          =    "cannot show Locale information.";
            LocaleCountryName =    "java.util.Locale is a 1.1.0 class";
        }
        repaint( );
    }
}
/**************************************************************/
    public void outputFrom11(String output)
    {
        this.output = output;
    }
/**************************************************************/
    public void paint(Graphics g)
    {
        g.setColor(Color.black);
        g.drawString(output, 10, 25);
        g.drawString(LocaleName, 10, 50);
        g.drawString(LocaleID, 10, 75);
        g.drawString(LocaleCountryName, 10, 100);
    }
/**************************************************************/
    public boolean handleEvent(Event evt)
    {
        switch (evt.id) {
            case Event.WINDOW_DESTROY:
                System.exit(0);
                return super.handleEvent(evt);
            case Event.ACTION_EVENT:
                if (evt. target instanceof LocaleInterface) {
                    output = (String)evt.arg;
                    repaint( );
                }
                return super.handleEvent(evt);
            default:
                return super.handleEvent(evt);
        }
    }
}
```

Java Version 1.1 Class

```
/**************************************************************/
improt java.awt.*;
import java.util.*;
import java.applet.*;
/**************************************************************/
/*    CLASS MyLocale                                           */
/**************************************************************/
class MyLocale implements LocaleInterface {
```

-continued

```
//class MyLocale extends LocaleAbstract {
    Applet owner;
    Locale myLocale;
/****************************************************************/
    public MyLocale( ) {
        myLocale = myLocale.getDefault( );
    }
/****************************************************************/
    public void fakeConstructor(Applet owner) {
        this.owner = owner;
    }
/****************************************************************/
    public void sayHello(String str) {
        String Data = new String("Hello from 11 class. You passed me:
"+str);
        owner.handleEvent(new Event(this, Event.ACTION_EVENT, Data));
    }
/****************************************************************/
    public String getLocaleName( ) {
        return( myLocale.getDisplayName( ) );
    }
/****************************************************************/
    public String getLocaleID( ) {
        return( myLocale.toString( ) );
    }
/****************************************************************/
    public String getLocaleCountryName( ){
        return( myLocale.getDisplayCountry( ) );
    }
}
```

When the above code is downloaded, the JVM loader parses the code and checks each called class for validity. The "fakeConstructor" class called in the above code, and which is a Java version 1.1 class, will be used for illustrative purposes. When the loader sees the call for the "locale.fakeConstructor" method, the loader verifies the method and its parameters.

The loader verifies that the method call to "fakeConstructor" exists in class "locale" and that the correct number and type of parameters were passed to the method. Since the "locale" class was instantiated and cast as class interface "LocaleInterface", the loader will only check the class interface and make sure the call to "fakeConstructor" exists and was called correctly.

As shown in the class interface "LocaleInterface", "fakeConstructor" requires the calling class to pass an instance of the applet as the only parameter. Class "Coexist", is the class that calls "fakeConstructor" and is an instance of the applet. "Coexist" passes "this" as the one parameter to "fakeConstructor". This means pass an instance of itself, "Coexist", which is an applet. The loader verifies that method "fakeConstructor" exists in the class interface and that the caller correctly passed an instance of the applet, thereby allowing execution to continue.

The loader sees that fakeConstructor was forced to be a "locale" class as defined by the naming convention "locale.fakeConstructor". The locale class is also the class interface described above. The loader goes to the locale class (class interface) which was downloaded with the applet code. The locale class is shown below:

Class Interface (Locale Class)

```
import java.applet.*;
interface LocaleInterface {
    public void fakeConstructor(Applet applet);
    public void sayHello(String s);
    public String getLocaleName();
    public String getLocaleID();
    public String getLocaleCountryName();
}
```

As illustrated above, the fakeConstructor class is listed in the class interface. The loader verifies that the types of parameters in the called fakeConstructor class and the fakeConstructor class listed in the class interface match. If the parameters match the loader tells the JVM that nothing is invalid about this class, even if the Java version of the JVM is 1.0. This iteration is repeated for each called class and is represented schematically in FIG. 3 by Blocks 204–216.

After verifying all downloaded classes, the Java version of the JVM is checked using the following code:

Checks JVM Version

```
import java.util.StringTokenizer;
public class JavaVersion
{
    // Brad's version check routine
    static public boolean isVersion110( ) {
        int             position=0, i=0;
        String          Version;
        StringTokenizer ver;
        Version = System.getProperty("java.version");
        for (i=0; i < Version.length( ); i++)
            if (versioncharAt(i)=='1') {
                Version = Version.substring(i, Version.length( ));
                break;
            }
        for (i=0; i < Version.length( ); i++)
            if (!(
                    (Character.isDigit(Version.charAt(i))) ||
(Version.charAt(i)=='.')
                )) {
                Version = Version.substring(0, i);
                break;
            }
        ver = new StringTokenizer(Version, ".");
        Version = "";
```

-continued

Checks JVM Version

```
        while (ver.hasMoreTokens( )) {
            position++;
            Version += ver.nextToken( );
        }
        if (Version.length( ) == 1)
            Version += "00";
        else if (Version.length( ) == 2)
            Version += "0";
        if (position > 3)      //check for 4 digits (ex. 1.0.2.0)
            Version = Version.substring(0,3);
        int intVersion = Integer.parseInt(Version);
        if (intVersion >=110)
            return true;
        else
            return false;
    }
}
```

If the JVM is version 1.0, 1.1 or higher version classes will not be usable, but will not cause the applet to crash either. A message to the user is typically displayed saying that the called class has a Java version higher than the JVM and is not usable.

As illustrated, the version 1.0 class calls the version 1.1 class and passes it data. The version 1.1 class passes the data back to the version 1.0 class by calling the handleEvent() method. The version 1.1 class has two ways to pass data back to the version 1.0 class: it can return a version 1.0 object; or call a method in the version 1.0 class. For example, the "getLocaleID" method returns a string to the calling class. For the version 1.1 class to call a method in the 1.0 class, the version 1.0 class uses the "fakeconstructor" method call to pass an instance of itself to the version 1.1 class. This allows the version 1.1 class to communicate with the version 1.0 class in the event it needs to pass data back to the version 1.0 class. The version 1.0 class passes an instance of itself using the following code: "locale.fakeConstructor(this)." The version 1.1 class saves the applet instance as follows: "this.owner=owner." The version 1.1 class passes data back to the version 1.0 class by calling the handleEvent() method in the version 1.0 class as follows: "owner.handleEvent(newEvent(this, Event.ACTION_EVENT, Data))."

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of executing an applet within a first Java version of a Java Virtual Machine running on a client, wherein the applet includes at least one call to an object class associated with a second Java version of the Java Virtual Machine, the method comprising the steps of:

downloading the applet to the client, wherein the applet includes each object class called within the applet;

downloading to the client a class interface having at least one respective identifier for the object class associated with the second Java version of the Java Virtual Machine called by the applet; and executing the downloaded applet within the first Java version of the Java Virtual Machine without causing an error condition by the at least one call to an object class associated with the second Java version of the Java Virtual Machine.

2. A method according to claim 1, wherein calls to object classes associated with the second Java version of the Java Virtual Machine not identified within the downloaded class interface are not allowed.

3. A method according to claim 1, wherein the step of downloading the applet to the client comprises sending a request to activate the applet from the client to a server hosting the applet.

4. A method according to claim 1, further comprising the step of identifying each downloaded object class associated with the second Java version of the Java Virtual Machine.

5. A method according to claim 4, further comprising the step of verifying that each identified object class associated with the second Java version of the Java Virtual Machine has a respective identifier in the class interface.

6. A method according to claim 4 wherein the step of identifying each downloaded object class associated with the second Java version of the Java Virtual Machine is performed by a loader within the first Java version of the Java Virtual Machine.

7. A method according to claim 1, wherein the downloaded class interface has a plurality of identifiers for a plurality of respective object classes associated with the second Java Version of the Java Virtual Machine called by the applet.

8. A method of executing an applet within a first Java version of a Java Virtual Machine running on a client, wherein the applet includes at least one call to an object class associated with a second Java version of the Java Virtual Machine, the method comprising the steps of:

sending a request to activate the applet from the client to a server hosting the applet;

downloading the applet to the client, wherein the applet includes each object class called within the applet;

downloading to the client a class interface having at least one respective identifier for at least one respective object class associated with the second Java version of the Java Virtual Machine called by the applet;

identifying each downloaded object class associated with the second Java version of the Java Virtual Machine;

verifying that each identified object class associated with the second Java version of the Java Virtual Machine has a respective identifier in the class interface; and executing the downloaded applet within the first Java version of the Java Virtual Machine without causing an error condition by the at least one call to the object class associated with the second Java version of the Java Virtual Machine.

9. A method according to claim 8, wherein calls to object classes associated with the second Java version of the Java Virtual Machine not identified within the downloaded class interface are not allowed.

10. A method according to claim 8, wherein the step of identifying each downloaded object class associated with the second Java version of the Java Virtual Machine is performed by a loader within the Java Virtual Machine.

11. A method according to claim 8, wherein the downloaded class interface has a plurality of identifiers for a plurality of respective object classes associated with the second Java version of the Java Virtual Machine called by the applet.

12. A method of executing an application within a first version of a runtime system, wherein the application includes at least one call to an object class of a second version of the runtime system, the method comprising the steps of:

loading the application, including each object class called by the application, into the first version of the runtime system;

loading a class interface having at least one identifier for at least one respective object class of the second runtime system version called by the application; and executing the application within the first version of the runtime system without causing an error condition by the at least one call to a second runtime system version object class.

13. A method according to claim 12, wherein calls to object classes of the second runtime system version not identified within the downloaded class interface are not allowed.

14. A method according to claim 12, further comprising the step of identifying each loaded second runtime system version object class.

15. A method according to claim 14, comprising the step of verifying that each identified second runtime system version object class has a respective identifier in the class interface.

16. A method according to claim 14, wherein the downloaded class interface has a plurality of identifiers for a plurality of respective second runtime system version object classes called by the application.

17. A data processing system for executing an applet within a first Java version of a Java Virtual Machine running on a client, wherein the applet includes at least one call to object class, associated with a second Java version of the Java Virtual Machine, the data processing system comprising:

first means for downloading the applet to the client, wherein the applet includes each object class called within the applet;

second means for downloading to the client a class interface having at least one respective identifier for the object class associated with the second Java version of the Java Virtual Machine called by the applet; and means, responsive to said first and second downloading means, for executing the downloaded applet within the first Java version of the Java Virtual Machine without causing an error condition by the at least one call to an object class associated with the second Java version of the Java Virtual Machine.

18. A data processing system according to claim 17, wherein calls to object classes associated with the second Java version of the Java Virtual Machine not identified within the downloaded class interface are not allowed.

19. A data processing system according to claim 17, wherein said first means for downloading the applet to the client comprises means for sending a request to activate the applet from the client to a server hosting the applet.

20. A data processing system according to claim 17, further comprising means for identifying each downloaded object class associated with the second Java version of the Java Virtual Machine.

21. A data processing system according to claim 20, further comprising means for verifying that each identified object class associated with the second Java version of the Java Virtual Machine has a respective identifier in the class interface.

22. A data processing system according to claim 20 wherein said means for identifying each downloaded object class associated with the second Java version of the Java Virtual Machine comprises a loader within the first version of the Java Virtual Machine.

23. A data processing system according to claim 17, wherein the downloaded class interface has a plurality of identifiers for a plurality of respective object classes associated with the second Java version of the Java Virtual Machine called by the applet.

24. A computer program product for executing an applet within a first Java version of a Java Virtual Machine running on a client, wherein the applet includes at least one call to an object class associated with a second Java version of the Java Virtual Machine, said computer program product comprising:

a computer usable medium having first computer readable program code means embodied in said medium for downloading the applet to the client, wherein the applet includes each object class called within the applet;

the computer usable medium having second computer readable program code means embodied in said medium for downloading to the client a class interface having at least one respective identifier for the object class associated with the second Java version of the Java Virtual Machine called by the applet; and the computer usable medium having computer readable program code means embodied in said medium, responsive to said first and second computer readable program code means, for executing the downloaded applet within the first Java version of the Java Virtual Machine without causing an error condition by the at least one call to an object class associated with the second Java version of the Java Virtual Machine.

25. A computer program product according to claim 24, wherein calls to object classes associated with the second Java version of the Java Virtual Machine not identified within the downloaded class interface are not allowed.

26. A computer program product according to claim 24, wherein said first computer readable program code means for downloading the applet to the client comprises computer readable program code means for sending a request to activate the applet from the client to a server hosting the applet.

27. A computer program product according to claim 24, further comprising computer readable program code means embodied in said computer usable medium for identifying each downloaded object class associated with the second Java version of the Java Virtual Machine.

28. A computer program product according to claim 27, further comprising computer readable program code means embodied in said computer usable medium for verifying that each identified object class associated with the second Java version of the Java Virtual Machine has a respective identifier in the class interface.

29. A computer program product according to claim 24, wherein the downloaded class interface has a plurality of identifiers for a plurality of respective object classes associated with the second Java version of the Java Virtual Machine called by the applet.

* * * * *